Patented Aug. 28, 1928.

1,682,382

UNITED STATES PATENT OFFICE.

GEORG KRÄNZLEIN, ARTHUR VOSS, AND FRANZ BRUNNTRÄGER, OF HOCHST-ON-THE-MAIN, GERMANY, ASSIGNORS TO I. G. FARBENINDUSTRIE AKTIENGESELLSCHAFT OF FRANKFORT-ON-THE-MAIN, GERMANY, A CORPORATION OF GERMANY.

SULPHONATED-CELLULOSE DERIVATIVES AND PROCESS OF PREPARING THEM.

No Drawing. Application filed July 25, 1927, Serial No. 208,406, and in Germany September 10, 1926.

Our present invention relates to the manufacture of sulphonated cellulose derivatives.

We have found that cellulose in the form of its alkali compound is transformed in an easy way into readily water-soluble compounds by the action of aralkylhalogensulphonic acids. The new compounds must be regarded as being cellulosebenzylethersulphonic acids; it is for the first time that such derivatives of the carbon hydrates having a free sulpho group have been produced. They cannot be separated from their clear aqueous solution, not even by acidifying it. In order to prepare them in a pure state they are advantageously transformed into their calcium salts or barium salts which are difficultly soluble in water and from which the free acid can be isolated according to known methods. The quantitative proportion of the two components can be varied within rather wide limits. The new bodies have over the hitherto known cellulose derivatives, besides their water-solubility, the advantage of being incombustible and they are, therefore, among other uses very well suitable for impregnating textile materials or producing fire-proof films.

In order to impregnate vegetable or animal fibres with our new products, the textile fabrics are soaked with the water-soluble compounds, and a metal salt of the cellulose-benzylsulphonic acid is then precipitated on the fiber by adding a salt of a heavy metal or of another related metal, for instance a salt of aluminium. The new compounds offer furthermore the advantage that no organic solvents are required for dissolving them, as is the case with most of the other cellulose derivatives.

The following examples serve to illustrate our invention, but they are not intended to limit it thereto:

1. 18 parts of mercerized cellulose are kneaded for 2 hours with 100 parts by weight of an alcoholic caustic soda solution of 20% strength. After having added to the mass 22.8 parts by weight of sodium benzylchloride-para-sulphonate in 100 parts by volume of alcohol, the mixture is again kneaded for 8 hours at 50° to 60° C., whereupon the alcohol is removed by evaporation. The residue forms a whitish mass which is readily soluble in water, rather difficultly soluble in alcohol and almost insoluble in acetone and benzene.

2. 36 parts by weight of mercerized cellulose and 120 parts by weight of an aqueous caustic potash solution of 60 per cent strength are intimately kneaded with one another for two hours, the excess of caustic potash solution is then squeezed off and the mass is allowed to remain in the air for some time. It is then kneaded at 50° C. to 60° C. with 92 parts by weight of sodium benzylchloride-ortho-sulphonate until the product is entirely soluble in water. The reaction product thus obtained has almost the same properties as the product obtainable according to Example 1.

3. 18 parts of air-dried mercerized cellulose are soaked with 32 parts by weight of anhydrous pyridine. To this mass are then added, while stirring, 48.2 parts of sodium xylylchloride-sulphonate in fine subdivision, and the mass is kneaded until it has become soluble in water.

We claim:

1. The process of preparing sulphonated cellulose derivatives by causing cellulose to react with an aralkylhalogensulphonic acid in the presence of an alkaline agent.

2. The process of preparing sulphonated cellulose derivatives by causing cellulose to react with an aralkylhalogensulphonic acid at an elevated temperature in the presence of an alkaline agent.

3. The process of preparing sulphonated cellulose derivatives by causing cellulose to react with an aralkylhalogensulphonic acid in the presence of alcoholic caustic soda solution.

4. The process of preparing sulphonated cellulose derivatives by causing cellulose to react with an aralkylhalogensulphonic acid at an elevated temperature in the presence of alcoholic caustic soda solution.

5. The process of preparing sulphonated cellulose derivatives by causing cellulose to react with a benzylchloridesulphonate in the presence of an alkaline agent.

6. The process of preparing sulphonated cellulose derivatives by causing cellulose to react with a benzylchloridesulphonate at an elevated temperature in the presence of an alkaline agent.

7. The process of preparing sulphonated cellulose derivatives by causing cellulose to react with a benzylchloridesulphonate in the presence of alcoholic caustic soda solution.

8. The process of preparing sulphonated cellulose derivatives by causing cellulose to react with a benzylchloridesulphonate at an elevated temperature in the presence of alcoholic caustic soda solution.

9. The process of preparing sulphonated cellulose derivatives by causing cellulose to react with sodium benzylchloride-para-sulphonate in the presence of an alkaline agent.

10. The process of preparing sulphonated cellulose derivatives by causing cellulose to react with sodium benzylchloride-para-sulphonate at an elevated temperature in the presence of an alkaline agent.

11. The process of preparing sulphonated cellulose derivatives by causing cellulose to react with sodium benzylchloride-para-sulphonate in the presence of alcoholic caustic soda solution.

12. The process of preparing sulphonated cellulose derivatives by causing cellulose to react with sodium benzylchloride-para-sulphonate at an elevated temperature in the presence of alcoholic caustic soda solution.

13. As new products, compounds substantially identical with sulphonated cellulose derivatives obtainable by causing cellulose to react with an aralkylhalogensulphonic acid in the presence of an alkaline agent.

14. As new products, compounds substantially identical with sulphonated cellulose derivatives obtainable by causing cellulose to react with a benzylchloridesulphonate in the presence of alcoholic caustic soda solution.

15. As new products, compounds substantially identical with the sulphonated cellulose derivative obtainable by causing cellulose to react with sodium benzylchloride-para-sulphonate in the presence of alcoholic caustic soda solution.

In testimony whereof we affix our signatures.

GEORG KRÄNZLEIN.
ARTHUR VOSS.
FRANZ BRUNNTRÄGER.